United States Patent [19]

Varela, Jr.

[11] Patent Number: 5,172,784
[45] Date of Patent: Dec. 22, 1992

[54] HYBRID ELECTRIC PROPULSION SYSTEM

[76] Inventor: Arthur A. Varela, Jr., 6008 Grove Dr., Alexandria, Va. 22307

[21] Appl. No.: 688,117

[22] Filed: Apr. 19, 1991

[51] Int. Cl.⁵ .............................................. B60L 11/12
[52] U.S. Cl. .................... 180/65.4; 180/65.8; 180/76; 290/1 A; 310/126
[58] Field of Search ............... 180/65.4, 65.3, 65.1, 180/65.2, 65.6, 965, 76, 62; 290/1 A, 1 R, 2; 318/126; 310/156

[56] References Cited

U.S. PATENT DOCUMENTS

| | | | |
|---|---|---|---|
| 887,483 | 5/1908 | Ledwinka | 180/65.3 |
| 1,348,539 | 8/1920 | Breitenbach | 180/62 |
| 2,900,592 | 10/1958 | Baruch | 321/8 |
| 3,234,395 | 2/1966 | Colgate | 290/1 |
| 3,551,685 | 12/1970 | Corry | 290/14 |
| 3,675,031 | 7/1972 | Lavigne | 290/1 |
| 3,837,419 | 9/1974 | Nakamura | 318/139 |
| 4,113,045 | 9/1978 | Downing | 180/65 |
| 4,119,861 | 10/1978 | Gocho | 290/18 |
| 4,306,156 | 12/1981 | Monaco | 290/17 |
| 4,444,285 | 4/1984 | Stewart | 180/65.4 |
| 4,454,426 | 6/1984 | Benson | 290/1 R |
| 4,511,805 | 4/1985 | Boy Marcotte | 290/2 |
| 4,644,207 | 2/1987 | Catterfield | 310/126 |
| 4,649,283 | 3/1987 | Berchowitz | 280/1 |
| 4,811,563 | 3/1989 | Furuishi | 60/517 |
| 4,824,149 | 6/1989 | Renchlein | 290/1 |
| 4,924,956 | 5/1990 | Deng et al. | 180/65.3 |
| 4,951,769 | 8/1990 | Kawamura | 180/65.4 |

OTHER PUBLICATIONS

Ayres, Robert U., Alternatives to the Internal Combustion Engine, 1973.
Miner, Richard J., A Status Study of Hybrid and Related Vehicle Projects, May 1990, DOE.
Brusaglino, G., Overview of European Research and Development of Electric Hybrid Vehicles, EVD, Oct. 1988.
Renner, Roy A., An Assessment of Hybrid Electric Propulsion Systems, EPRS, EPRI EM-4700, Sep. 1986.

*Primary Examiner*—David M. Mitchell
*Attorney, Agent, or Firm*—Dalton L. Truluck

[57] ABSTRACT

A hybrid electric vehicle propulsion system having an external combustion free-piston engine is provided with an integral linear electric current generator and a pulse frequency controller. The system includes a power integration processor, a frequency modulator circuit and a pulse width modulator circuit, the power integration processor controls the frequency modulator circuit and the pulse width modulator circuit to produce both a frequency modulated pulsed current and an auxiliary power current which varies in pulse width. Both the frequency modulated pulsed current and the pulse width modulated auxiliary current are combined to power an electric drive motor having an integral electronic differential. A small auxiliary power source, such as a rechargeable battery pack, is provides the auxiliary current for acceleration and hill climbing power. The external combustion engine may burn any pollution free fuel (such as natural gas, alcohol, propane, etc.) and runs at a constant peak efficiency speed to generate constant frequency electric current from coils integrated into the engine. The generator current is sufficient to propel the vehicle in ordinary driving situations with smooth speed control of the drive motor. The propulsion motor combines one fixed stator, and two axially opposed permanent magnet or induction-type rotors, one for each output propulsion shaft.

27 Claims, 11 Drawing Sheets

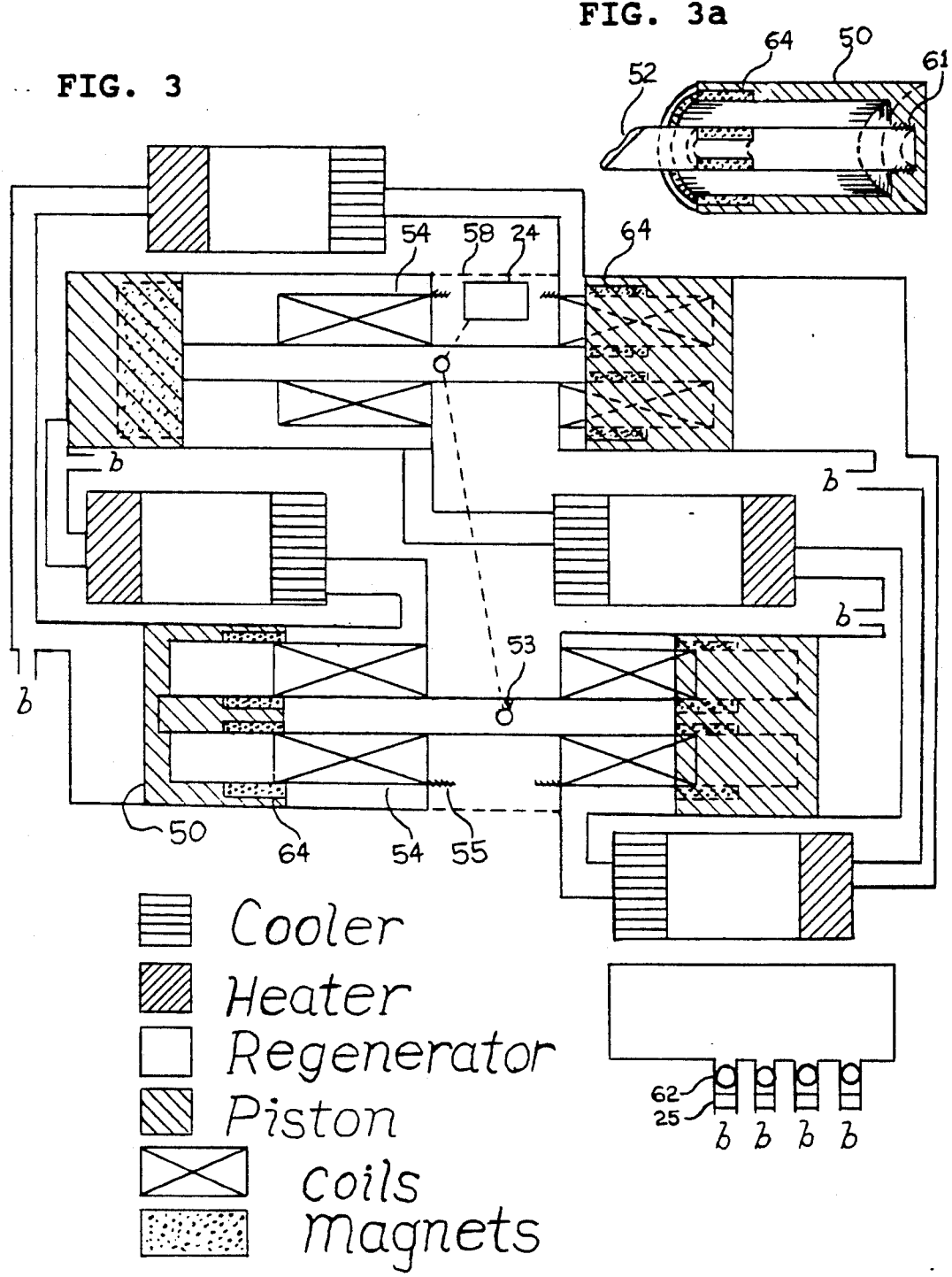

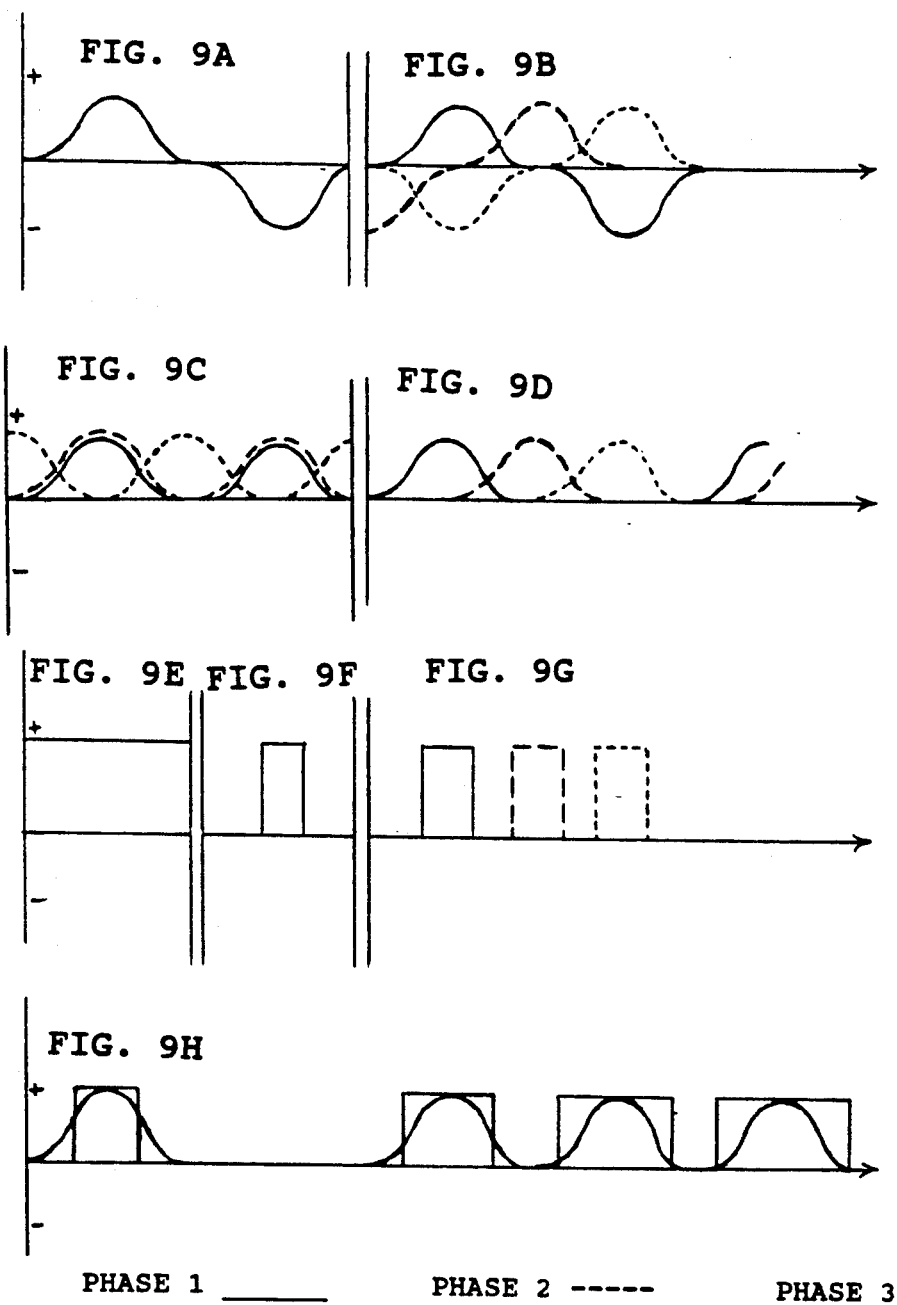

HYBRID ELECTRIC PROPULSION SYSTEM

FIELD OF THE INVENTION

This invention relates in general to hybrid electric vehicle propulsion systems.

BACKGROUND OF THE INVENTION

Electric vehicles, such as trains, trolleys, cars, trucks, carts and boats have been known in the art for a century, and have been commercially produced.

Modern electric vehicles, and hybrid (having more than one source of propulsion) electric vehicles have well-known advantages over Internal Combustion (IC) vehicles, such as lower pollution and alternatives to petrol-based energy. Research on electric vehicles has focused on improving large, heavy, and expensive battery packs, and the driving range, which is limited by the charge on the battery pack (the vehicle will stop when it is out of electric charge). The prior art has also concentrated on conversion of the direct current (DC) battery energy into complex DC pulse or alternating current (AC) to power lighter, more-reliable, less-expensive AC traction motors (but the conversion systems are complex and expensive).

Hybrid electric vehicles have smaller, lighter, less-expensive battery packs, and a longer range Many hybrids ("parallel hybrids") use an IC engine to supply traction drive, augmented by parallel electric motor propulsion. Other hybrids ("series hybrids") use an IC engine coupled to a generator which provides the electrical energy to recharge batteries which then power the electric traction motors The prior art has been primarily directed toward improving fuel-specific internal combustion engines which incur transitional losses when converting linear mechanical energy to electrical propulsion energy. Development of the art for mechanical (parallel) drive concentrated on improving the transition between electrical drive and mechanical drive, which is complex, inefficient, and cumbersome. The internal combustion engine is also inefficient and pollution prone when operated at the range of speeds needed for vehicle propulsion.

SUMMARY OF THE INVENTION

The present invention includes a hybrid electric vehicle propulsion system having a four-cylinder, diametrically-opposed external combustion free-piston Stirling-type engine with an integral linear generator (a "converter"); a pulse frequency/width current controller; an electric drive motor with electronic differential; and an auxiliary power supply with pulse synchronized auxiliary power. The external combustion engine burns any pollution-free fuel (such as natural gas, propane, alcohol, etc.) and runs at a constant peak efficiency speed to generate constant frequency electric current from coils integrated into the engine and excited by magnetic elements in the pistons. The current, sufficient to propel the vehicle in most traffic situations and on a level plane at a speed of at least 50 mph, is controlled by a pulse frequency modulation circuit and a pulse width modulation circuit to provide smooth speed control in the drive motor. Additional power is provided by the auxiliary power supply (which is recharged from 120v 60 Hz AC line current or from the linear electric current generator) synchronized with the output from the linear generator. The auxiliary power supply provides additional power for acceleration and hill climbing. A new electric drive motor is provided which includes a brushless AC or DC pulse motor combining one fixed stator field unit which provides the rotating magnetic field for two axially opposed rotors, one for each propulsion shaft. Sensors on the drive rotors and on steering position provide feedback for electronic differential. The electric drive motor also provides regenerative energy to recharge the auxiliary power supply upon deceleration and braking, and the linear generator recharges the auxiliary power supply during stop and start driving.

PRIOR ART

The art incorporating hybrid and electric propulsion systems for vehicles discloses systems comprised of a battery pack, a heat engine prime mover, a generator coupled to the prime mover (hybrids) and an electric traction motor connected to the generator. Typical systems of this type include several categories: (a) a large battery pack connected to a speed control for a DC motor coupled to a transmission and a differential; (b) a large battery pack connected to an AC or multiphase DC controller for a brushless DC or AC induction motor coupled to a transmission and differential; (c) a configuration as in (a) or (b) but with motors (at least two) at each output drive shaft, obviating the need for a differential; (d) a parallel hybrid with a heat engine coupled alternatively or coextensively to an electric generator and to the output drive shafts through a transmission and differential. The generator is connected through a controller to an electric motor coupled through a clutch to the transmission; (e) a series hybrid with a heat engine coupled to the shaft of an electric generator which delivers DC current (or rectified AC current) to a controller which operates the electric propulsion motor as in (a) or (b) above; and (f) an energy conversion apparatus whereby an external combustion engine is coupled to a rotary or linear generator (a "range extender").

One of the primary considerations in the design of modern vehicular propulsion systems is the achievement of fuel-efficiency, with greater reliance on non-petrol-based, non-polluting propulsion sources for vehicles. The fuel efficiency of internal combustion engines is optimal only when operated at a constant speed and under constant load. When an IC motor vehicle is operated in traffic, the fuel efficiency is reduced substantially by the stop and start driving with the engine alternately under load and no-load conditions.

While systems of the types listed in the categories above achieve certain goals, none of them discloses a comprehensive solution to fuel efficiency, cost efficiency, pollution reduction, and driveability demands that present restricted fuel supply conditions dictate Each system has certain drawbacks that frustrate the attainment of their efficiency goals.

Although Stirling-type engines have been known to the art since 1816, modern interest in the Stirling-type external combustion engine, capable of being efficiently powered by a variety of non-polluting fuels, has concentrated on the need to reduce both pollution and inefficient use of petroleum-based fuels. Use of the Stirling-type free-piston engine configuration to actuate a linear electric generator has been known to the art since about 1958 (Baruch; U.S. Pat. No. 2,900,592), system (f) above. Various improvements have been disclosed which have increased efficiency and reliability and reduced cost and weight.

However, the use of free piston Stirling-driven linear generators, category (f) above, has been primarily limited to the art of stationary energy conversion systems or special vehicle application. As such, these systems do not disclose a Stirling free-piston linear generator integrated into an electromechanical hybrid vehicle propulsion system. The prior art discloses other types of units which are complex, expensive, and raise safety concerns in the context of vehicle use. Currently disclosed Stirling electrical generating systems are inaccessible for maintenance and adjustment, and exhibit durability problems with respect to the magnetic piston elements and linear coils in the hot cylinder Stirling configuration.

A problem inherent in the use of DC motors such as those used in categories (a) and (b) are that these are bulky, heavy, and expensive in comparison to three-phase AC or DC pulse induction or permanent magnet motors. An additional advantage of the AC or DC phase pulse motor is that brush-commutator systems are not required.

Modern electric traction motor art has concentrated on achieving lighter weight, greater efficiency and better control, resulting in motors with very good power-to-weight ratios. However, both AC and DC brushless motors require complex, heavy, expensive speed control units, categories (a) and (b) above. In addition, many electric vehicle configurations continue to require heavy and efficiency-reducing gear transmissions and differentials, or, alternatively, require the added expense and weight of more than one drive motor, category (c) above, with complex electronic differential action. In addition, motors mounted independently at each wheel manifest inherent durability and safety problems (in the event that one of the traction motors fails and stops turning, resulting in power at only one wheel).

AC motors, while inexpensive and light-weight, require expensive, complex, and heavy variable frequency inverters and controllers.

Modern electric vehicles, categories (a) and (b) above, disclose a total vehicle range of only about 120-140 miles between full battery charges, and will not function once the batteries are discharged. Current electric vehicle battery systems are expensive, heavy, and require extensive maintenance, and high-power charging.

Modern parallel hybrid vehicles disclosed, category (d) above, are polluting, petroleum-fuel dependent, and inefficient in that each prime mover (mechanical-heat and electric) must be fully capable of providing all propulsion needs In addition, IC engines are inefficient when operated over a range of engine speeds and loads, require regular maintenance and produce toxic waste lubricant products which are contaminated through contact with the combustion process.

Series hybrid electric vehicles, category (e) above, disclosed, require complex, expensive control systems and frequently use IC engines in conjunction with heavy and inefficient transmissions and differentials, exhibiting the same drawbacks discussed above.

Inherent in the system (d), employing a hybrid combination of a prime mover, generator, and battery, is that both energy sources (generator and battery) must be fully capable of supplying maximum energy to the traction motor. Even though the prime mover and generator are operated at a constant RPM to minimize fuel consumption, the additional weight of the battery necessary to provide reasonable speed and driving range requires the provision of additional available energy from the two sources.

The disclosures of the following patents are incorporated by reference herewithin:

| U.S. Pat. No. 2,900,592 | August 18, 1959 to Baruch |
| U.S. Pat. No. 3,234,395 | February 8, 1966 to Colgate |
| U.S. Pat. No. 3,551,685 | December 29, 1970 to Corry |
| U.S. Pat. No. 3,675,031 | July 4, 1972 to Lavigne |
| U.S. Pat. No. 3,837,419 | September 24, 1974 to Nakamura |
| U.S. Pat. No. 4,113,045 | September 12, 1978 to Downing, Jr. |
| U.S. Pat. No. 4,119,861 | October 10, 1978 to Gocho |
| U.S. Pat. No. 4,306,156 | December 15, 1981 to Monaco et al. |
| U.S. Pat. No. 4,444,285 | April 24, 1984 to Stewart et al. |
| U.S. Pat. No. 4,454,426 | June 12, 1984 to Benson |
| U.S. Pat. No. 4,511,805 | April 16, 1985 to Boy-Marcotte et al. |
| U.S. Pat. No. 4,644,207 | February 17, 1987 to Catterfeld et al. |
| U.S. Pat. No. 4,649,283 | March 10, 1987 to Berchowitz et al. |
| U.S. Pat. No. 4,811,563 | March 14, 1989 to Furuishi et al. |
| U.S. Pat. No. 4,824,149 | April 25, 1989 to Reuchlein |

OBJECTS AND ADVANTAGES OF THE INVENTION

The object of the invention is to create a vehicle propulsion system which is non-polluting, light-weight, efficient, reliable, flexible in its use of alternative fuel sources, which duplicates the range and driving characteristics of existing internal combustion engines, and which can be used in many different basic vehicle types.

The advantages of this invention over existing internal combustion-based vehicles include ability to use a wide variety of non-polluting sources of power, fuel efficiency, cost-effectiveness of construction and operation, light-weight construction, lower maintenance cost, greater reliability, fewer moving parts (nine moving parts), regeneration of otherwise wasted energy and construction cost advantages.

The advantages of this invention over other disclosed electric vehicle propulsion systems include lower construction costs, higher efficiency, extensively longer range, greater reliability, lighter weight, reduced dependence on the battery system, quicker recharging, and improved driveability corresponding with driver acceptability.

The advantages of this invention over hybrid vehicle systems disclosed are increased operating efficiency, lower cost, flexible fuel options, lighter weight, lower pollution, simpler and more cost efficient construction, greater durability, less service and greater reliability.

BRIEF DESCRIPTION OF DRAWINGS

The preferred and alternate embodiments are represented in the accompanying drawings and are given by way of example and not of limitation:

FIG. 3 is a diagram of a four-cylinder integral linear generator producing pulsed current and a coupled displacer cylinder/piston;

FIG. 3a is a sectional view of a piston;

FIG. 9a-h shows the wave forms generated by the linear electric current generator, pulse frequency modulator, and the pulse width modulator, and transmitted to the motor windings.

DESCRIPTION OF THE STRUCTURE OF THE PREFERRED EMBODIMENT

Figure 1:
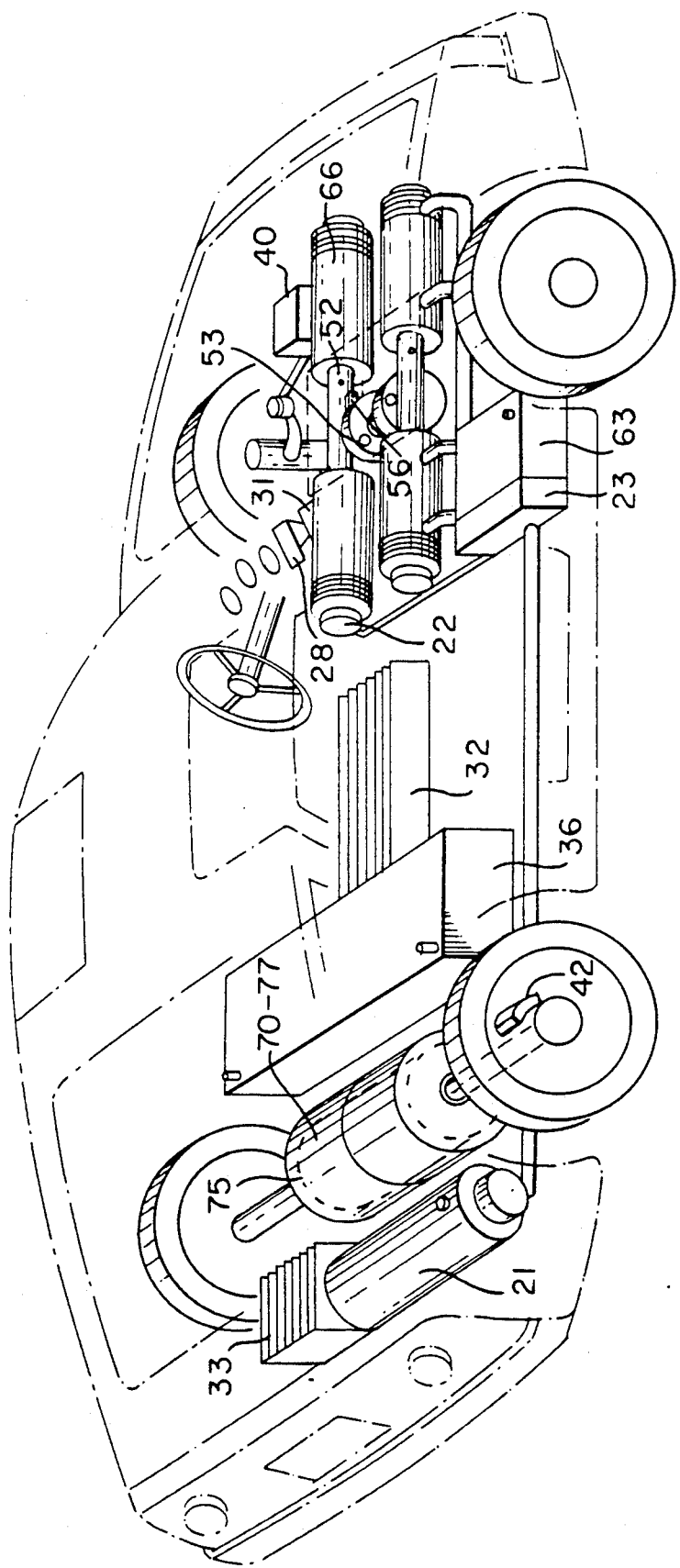
FIG. 1 is a perspective view of the system as installed in a vehicle.
Figure 2:
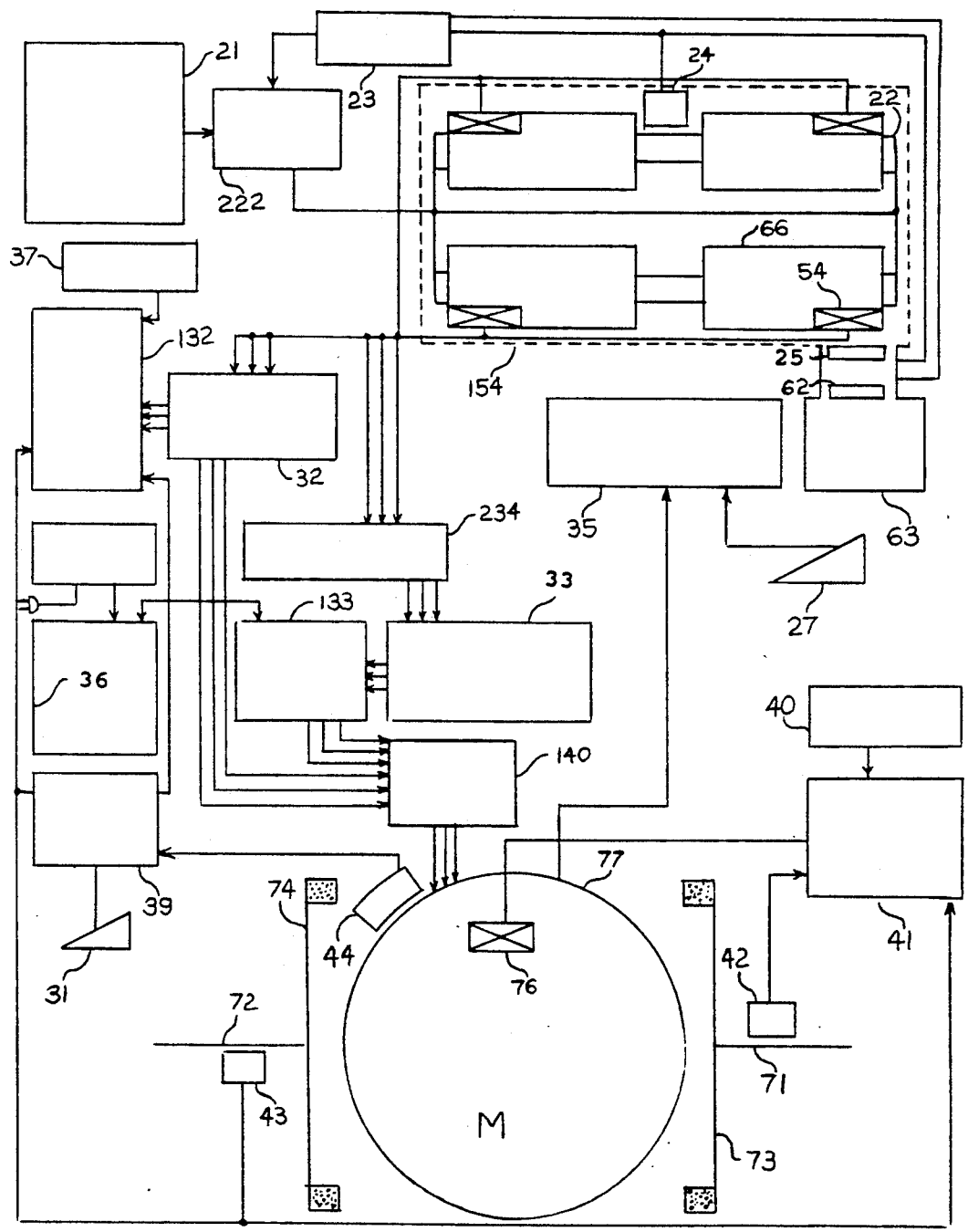
FIG. 2 is a block diagram of the electric circuits of the hybrid vehicle of FIG. 1.
Figure 3B:
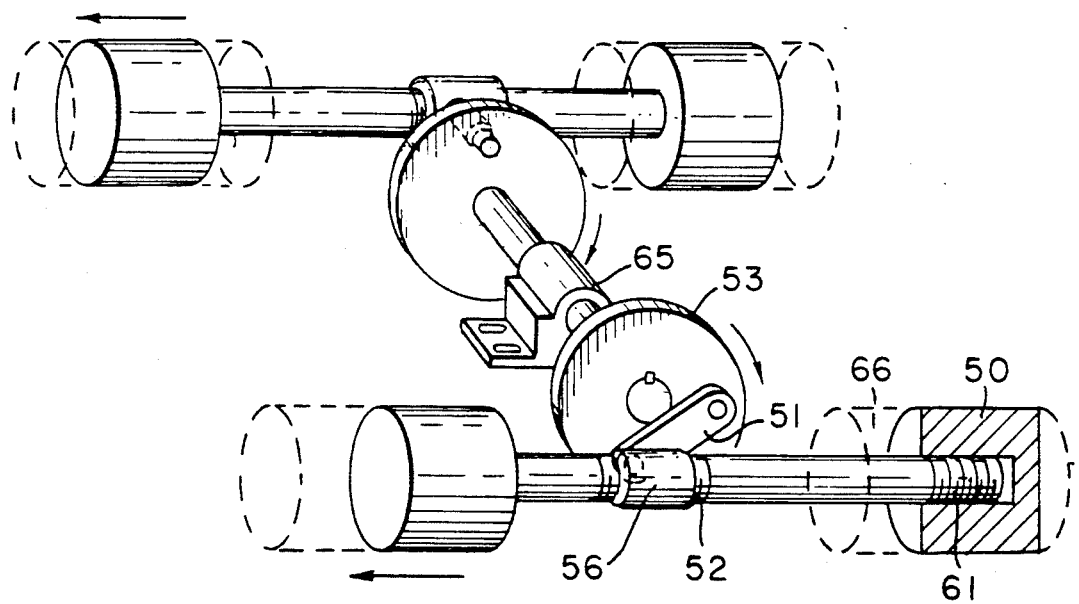
FIG. 3b is a perspective view of the crankshaft synchronizing mechanism.
Figure 4A:
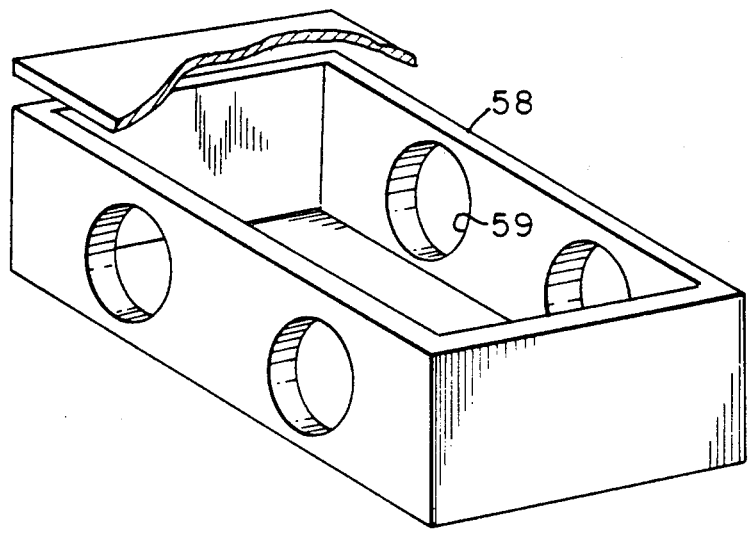
FIG. 4a is a top perspective view of the crankcase.

The preferred embodiment comprises a motor vehicle, FIG. 1, having an external combustion free-piston engine with integral linear electric generator (a converter), a speed control device, an auxiliary power source, and an electric propulsion motor. FIG. 1 shows a fuel source 21 utilizing any efficient non-polluting fuel source such as natural gas, propane, alcohol, etc. and an electromechanical means for fuel regulation related to the engine speed. FIGS. 1 and 2 show the engine speed sensor 24 and the cylinder pressure sensors 25 (FIG. 5) connected to the Governor/processor 23, which controls pressure valves 62 and an electronic fuel injector 22 on each cylinder. The external combustion four-cylinder or any multiple, such as six cylinder, free-piston engine (such as Stirling, FIG. 5; Rinia, FIG. 3; Franchot, FIG. 6; or Bush) incorporates integrated linear electric generators with its stator coils 54 wound onto coil forms in the cylinders 66 traversed by pistons 50 containing magnetic elements. The piston includes a hollow shell outer wall containing annular magnetic elements 64, (FIG. 3 and 3a) and the piston rods 52 also containing radially-aligned magnetic elements 64. Coils 50 in each of the cylinders may be wound to be in phase, phase cylinder-shifted, multi-phase or inverted phase, with each stator coil 54 providing a separate phase. Thus, the linear generator may be configured to provide one, two, three, four, or complex phase current, in any phase relationship, for example see FIG. 9. The linear generator also incorporates an initial assembly phase synchronization adjustment means: connecting rods 52, synchro crank 53, cylinder mounts 55, crankpin adjusters 56, cylinder head displacement adjustment 57, and crankcase manifold flange 59 (FIG. 4a), for adjusting the mechanical and electronic phase relationship between the piston and the cylinder coils and among cylinders. The crankcase completely pressure seals all mechanical parts and there is no mechanical linkage outside the engine; the crank mechanism as shown in FIG. 3b is merely to correlate or synchronize the piston movements.

Figure 10:
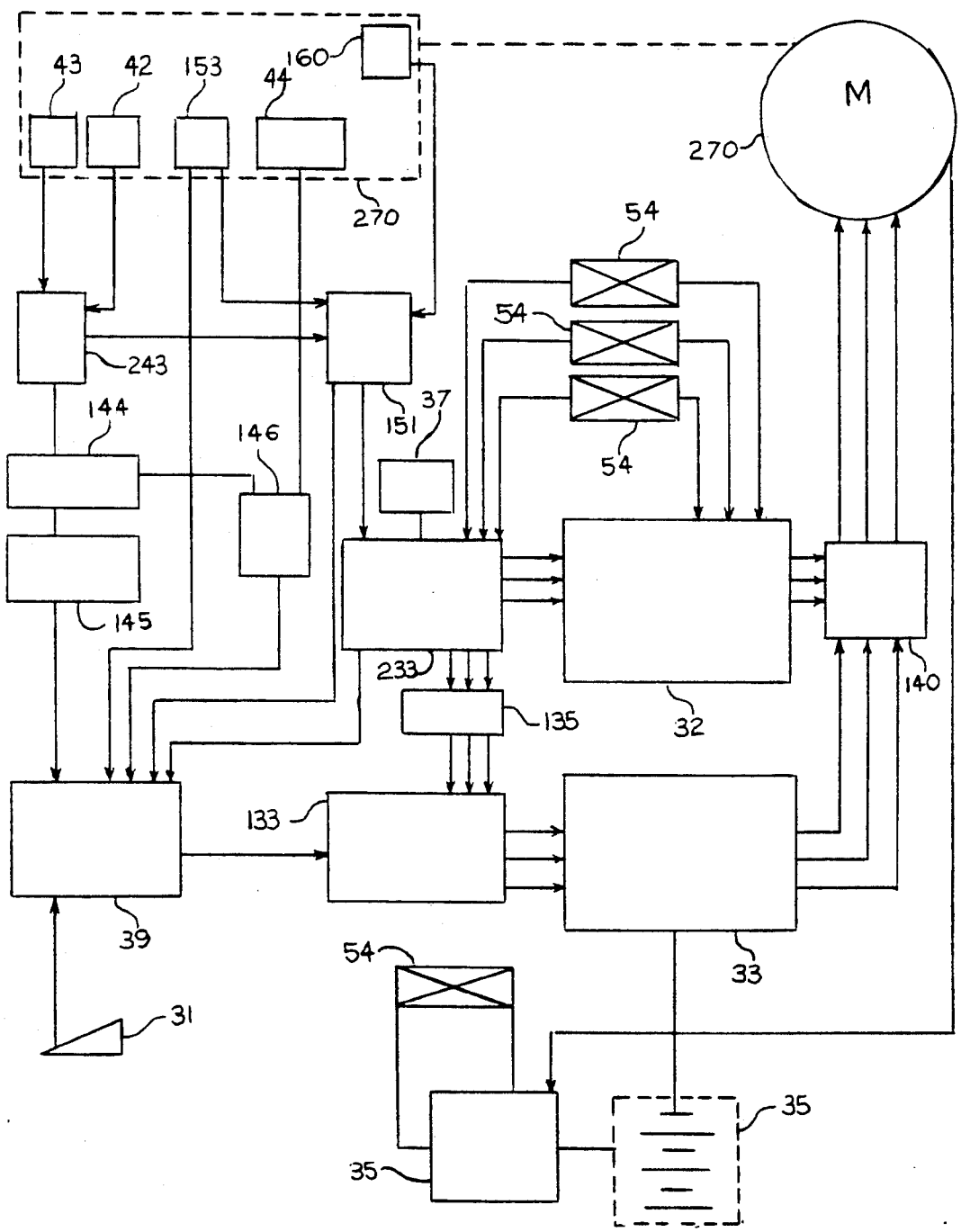
FIG. 10 is a block diagram of the controller circuits.

Referring now to FIG. 10, pulsed electrical power (FIG. 9), from the linear generators (coils 54, and magnetic piston elements 64 (FIG. 3)) is directed into an appropriate (single-phase, multi-phase, DC or AC) power frequency switching circuit 32 connected through frequency modulator circuit 132 and power integration processor 39 to accelerator position sensor 31 and other inputs. Auxiliary power supply 36 (e.g., a battery pack) provides reserve energy for acceleration and hill climbing. The reserve energy is controlled through a pulse width modulator circuit 133 synchronized by pulse synchro 234 (FIG. 2) to the above-mentioned generator; frequency modulation circuit 132 controls the linear generator output, and is connected to the accelerator 31, rotor speed sensors 42, 43 and field sensor 44 through the power integration processor 39. A reverse controller 47, well known to many electric vehicles, is connected to the frequency modulation circuit 132 to reverse the field of the motor and to reverse the direction of the vehicle.

Pulse modulator output is transferred to a DC or AC pulse brushless traction motor 270 (FIG. 7 and 8) (such a motor may include permanent magnet 174 or other lightweight design such as AC induction, multi-phase or DC brushless). The preferred embodiment incorporates a combination drive motor (FIG. 8) comprising a single cylindrical stator 75 with independent right 73 and left 74 rotors (permanent magnet in FIG. 7, 174, permanent magnet double shell (preferred) in FIG. 8, or squirrel-cage induction in FIG. 7, 273 and 274). The rotors are aligned by a rotor pilot thrust bearing 70 but are free to turn independently. Differentiation (and automatic braking sensing) is provided by right and left sensors 42 43 on the motor drive shafts. The sensors are also indirectly connected to the pulse frequency modulation circuit 132 to provide motor rpm feedback and rotor slip angle for pulse frequency modulation. In an alternative embodiment, input from steering angle sensor 40 and slip angle and electronic differentiation is provided through a traction differential processor 41 which switches center taps on the single stator field coils 76.

Instrumentation includes feedback readouts on fuel level; battery total elapsed energy in-out; battery charge; instantaneous battery current draw/charge; motor current draw; motor rpm; motor temperature; chopper temperature; engine temperature; and circuit breaker status.

OPERATION OF THE PREFERRED EMBODIMENT

In FIGS. 1 and 2, a hybrid electric vehicle propulsion system, the subject of this invention, includes a fuel supply 21 (such as natural gas, propane, alcohol, etc.; or even dual alternative fuel supplies, such as propane and natural gas) feeding, through speed-regulated electronic ignition 222, to the injectors 22 of an external combustion Stirling cycle (Rinia, Siemens, Bush or other configuration) reciprocating free-piston heat engine system. Engine speed sensor 24 (FIG. 3), transmits the engine reciprocating speed, and pressure sensors 25 (FIG. 5), transmit mean cylinder pressure to the governor/Processor 23, which governs injection rates to the individual injectors, and cylinder pressure balance valves 62 (FIG. 4) to individual cylinders to maintain constant speed, and to balance cylinder power output.

Free-piston movement is synchronized and controlled by a mechanical system, such as a small electromagnetic, gear, or lever apparatus. The preferred embodiment, as shown in FIG. 3b, incorporates connecting rods 51 rotating the synchro crankshaft 53, which does not produce primary power output from the engine, but is rather a timing device for synchronizing the pistons. The four cylinders 66 (or multiples thereof, such as six or eight) incorporate diametrically opposed phased linkage within the crankcase manifold 58, (FIG. 4a)), and require no external mechanical input or output. Thus the entire unit is completely sealed, thus reducing shaft seal pressure losses, which would otherwise reduce efficiency, and maintaining an efficient high pressure operating mode for the engine.

Figure 4:
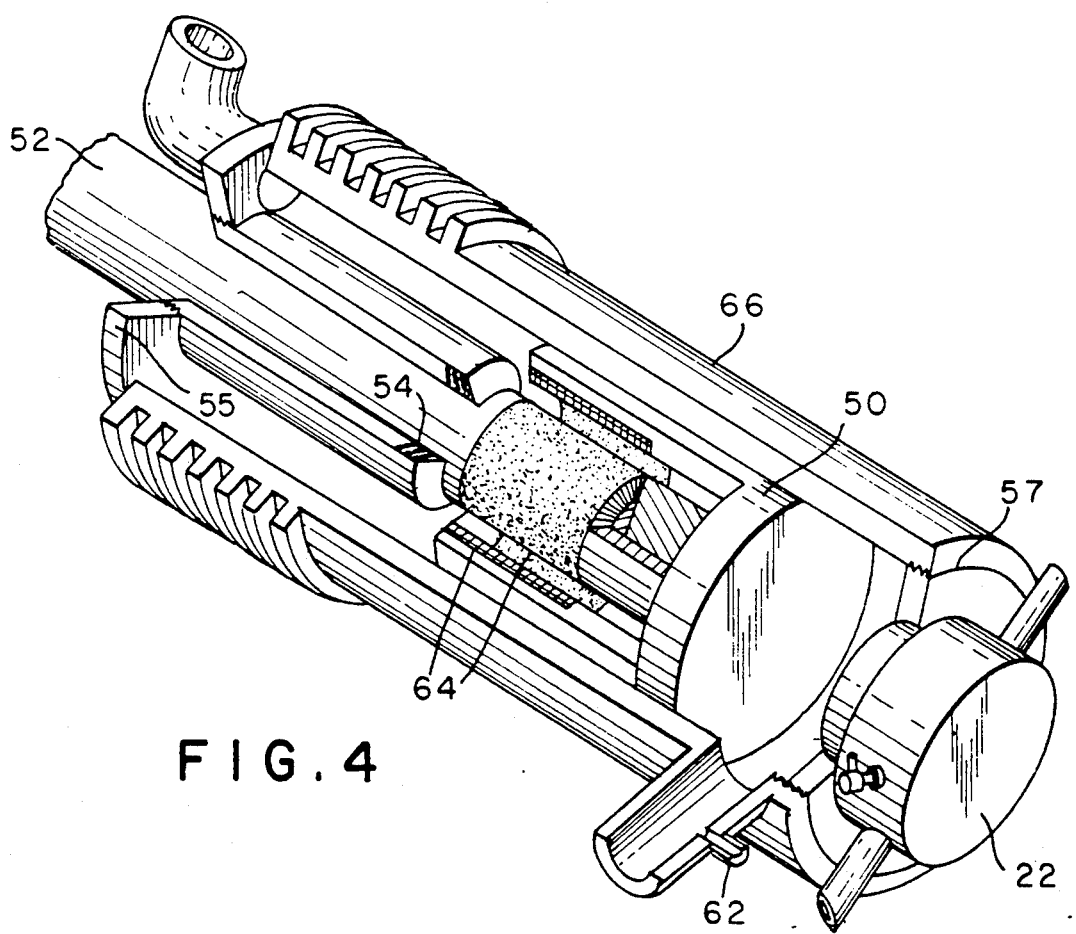
FIG. 4 is a perspective view, partly cut away and sectioned of one cylinder of a Stirling/Rinia reciprocating engine integrated with an electric linear current generator means.
Figure 5:
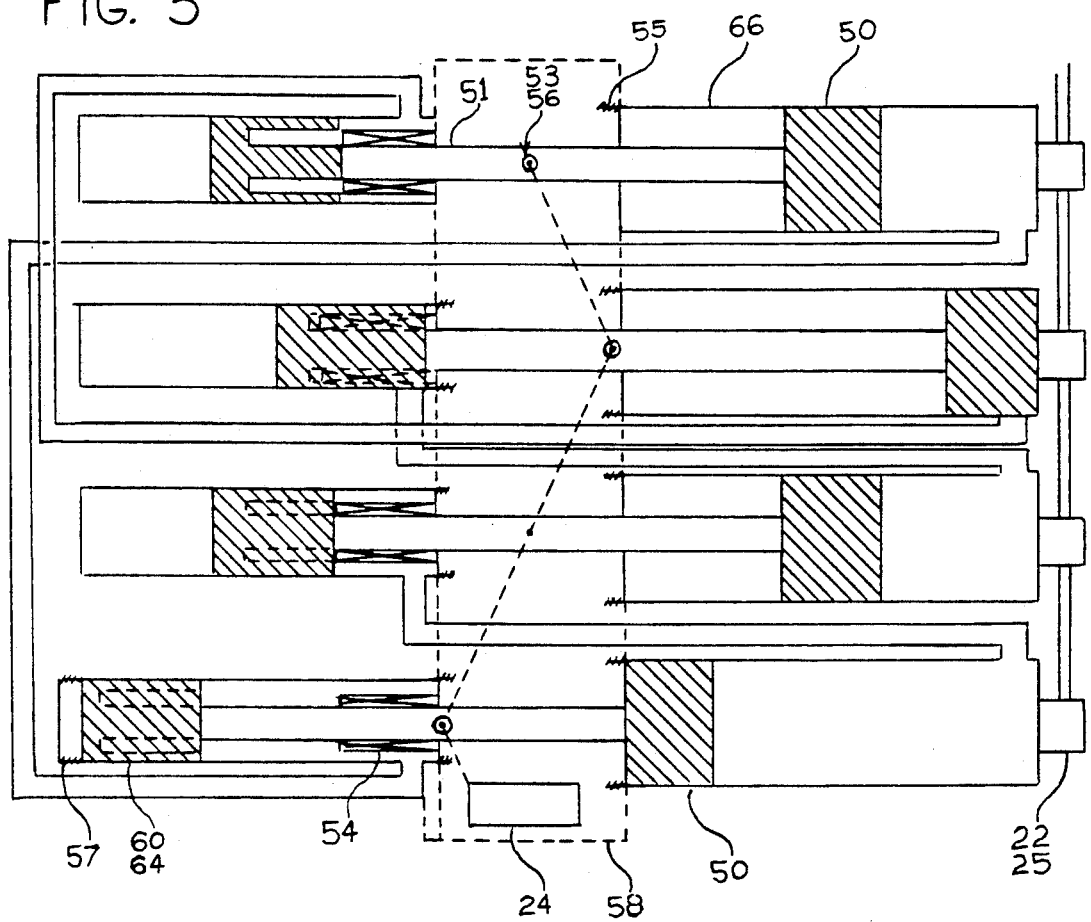
FIG. 5 is a sectional diagram of an alternative embodiment incorporating a single-acting free piston Stirling-type configuration of an engine/integral linear generator.
Figure 6:
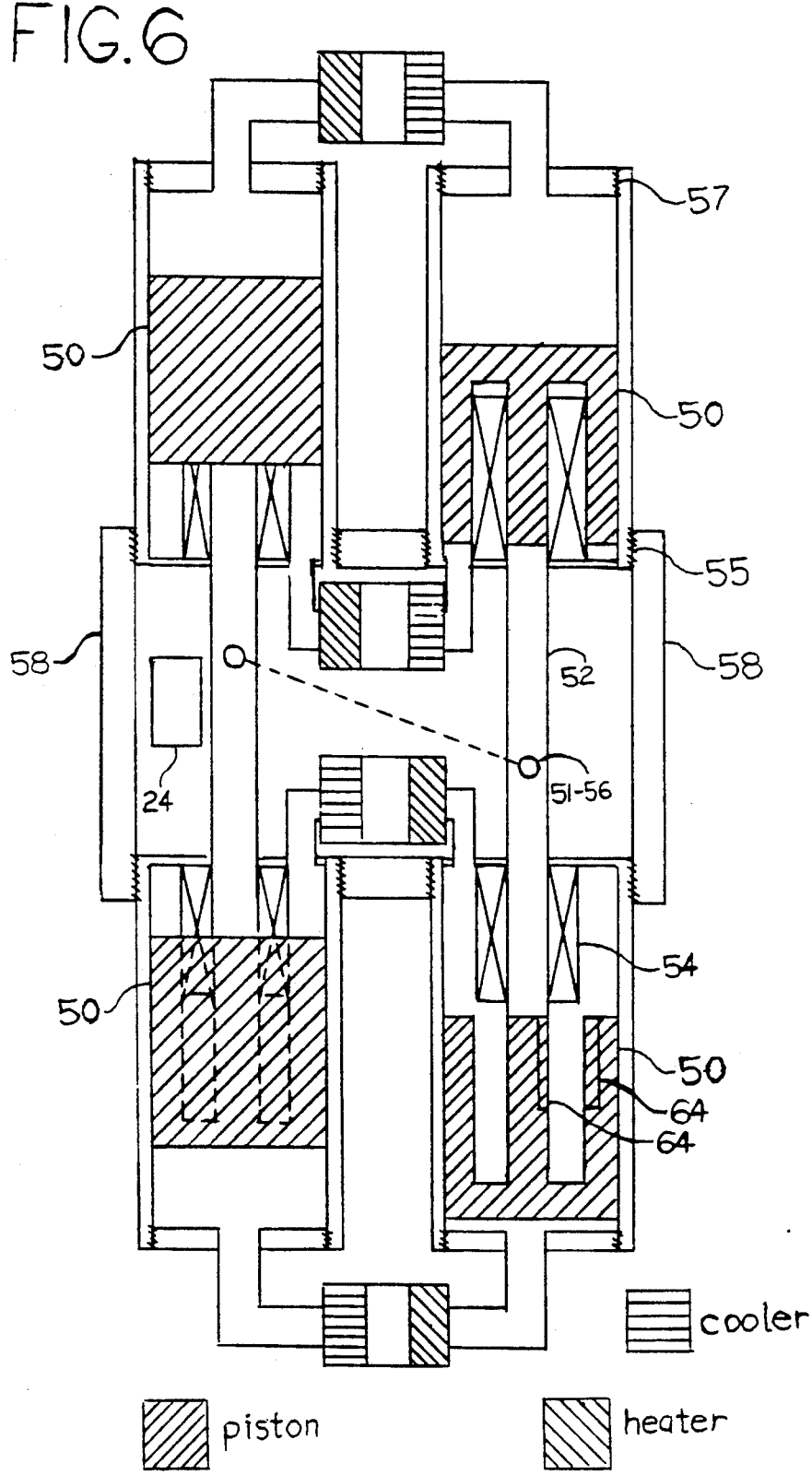
FIG. 6 is a sectional diagram of a double-acting free-piston Franchot-type Stirling cycle engine.

FIGS. 3a, 4 and 5 diagrammatically show the pistons 50 which incorporate piston magnetic elements 64 which reciprocate inside and outside of the integral linear coils 54, creating a high flux density. Each engine cylinder incorporates an integral stator electric coil 54, creating a linear electric generator 154 (FIG. 2). The engine configuration allows considerable variability in coil design and output characteristics. The coils 54 are positioned preferably within the walls of cylinder 66 to generate single phase, multiple phase, or complex phase amplitude or frequency modulated wave forms, or substantially filtered linear output.

The linear generator output of each of the cylinders can be phase-synchronized by mechanical adjustment apparatus as shown in FIG. 3b and integrated into each cylinder mounting flange 59, the crankcase manifold 58 (FIG. 4a), and through adjustable piston rods 52 and connecting rod phase adjusting crankpins 56. Construction of the cylinder/crankcase joint in this manner also allows independent service access to each cylinder and complete access to the crank synchronizing mechanism, while also ensuring the total engine pressure seal.

Output from the linear generator 154 is fed into a pulse frequency switching circuit 32, similar to the type generally in use for electric vehicles. The pulse circuit design (see FIG. 9) and type is matched to the traction motor characteristics (see FIG. 10). The preferred embodiment comprises a three phase output from three of the linear generators 154 (i.e. from three of the four cylinders) with frequency modulation for delivery to a three phase brushless motor system 270. The fourth generator (i.e. the forth cylinder) supplies electricity to the auxiliary power supply 36 (FIG. 2, FIG. 10). Feedback for the modulation control is provided from the left and right sensors 42, 43, the accelerator sensor 31 and the field sensor 44. A power integration processor 39 integrates pulse frequency output, accelerator position, and motor rpm to determine pulse frequency and pulse width by comparing the motor slip angle, rpm, and accelerator position. For example, at low motor speed, but high accelerator demand, the power integration processor 39 would increase the frequency and, hence, the slip angle slightly while increasing the pulse width considerably to supply the motor with higher torque needed for increasing load. If the accelerator continues in an advanced position, the controller would continue to advance the slip angle.

The linear generator system ("converter") 154 is capable of supplying sufficient power for traction motor operation under normal operating conditions (e.g., normal load, low-torque operating conditions). In a motor vehicle, the linear generator 154 output is sufficient to operate the vehicle in ordinary driving circumstances and on a level surface at a speed of at least 50 miles-per-hour.

The converter operates at constant speed to provide a constant-voltage, constant-frequency source from the Stirling-type engine. The engine is configured in a four cylinder, opposed design with opposing pistons rigidly connected through piston shafts to maintain engine phase relationships All cylinders are interconnected so that phase relationships tend &:o be naturally maintained and piston force augmented. Piston power equalization is accomplished through pressure valves 62 actuated by the governor/processor 23. When engine speed falls, the governor/processor 23 increases the heater temperature, and when engine speed exceeds the set limit, the governor/processor 23 lowers the heater temperature and releases pressure through cylinder pressure balance valves 62. Accumulator 63 accumulates pressure from the cylinders to provide a supply for balance pressure.

The preferred embodiment includes an electric motor 270 (FIG. 8) with a single cylindrical stator 75 and dual axially adjacent double-shell rotors 274; 375 (left and right), both operating in the single rotating field of the stator 75, which is created by stator coils 76. Each rotor is connected to an output drive shaft (left and right) 71, 72 and the rotors although aligned with each other through a central pilot bearing and thrust bearing 70 are not locked together but are capable of rotating at different speeds, as the vehicle is turning. The rotors may be permanent magnet or squirrel cage induction. Rotor construction could also include pancake or disc. Each of these rotor designs maintains the basic differential action embodied in this invention along with excellent flux immersion. Although both the rotors follow the same field and will tend to run at the same speed, each rotor is free to rotate at a different speed from the other rotor. However, if one of the rotors begins to accelerate (e.g., when a drive wheel slips on ice), it inherently decreases its slip angle with respect to the field, thereby decreasing its torque. Conversely, the slower moving rotor has a relatively larger slip angle with respect to the field, thereby increasing its torque. The motor is thereby capable of automatic electronic limited slip differential action, obviating the need for a heavy, inefficient mechanical differential.

In an alternative embodiment, in situations where differential action is required such as when a motor vehicle is turning and each wheel is turning at a different speed, the steering angle is detected by a steering angle sensor 40 and respective rotor torque controlled by traction differential Processor 41, with analysis of rotor shaft speed from the rotor sensors 42,43. Differential action is then fed to switches activating additional coils or diode controlled center taps 77 in the motor 270.

Regenerative energy is recaptured from the motor upon deceleration and braking. Energy from the stator is rectified by the rectifier regenerator circuit 35 and transferred back into a battery pack for auxiliary power supply 36. In addition, excess linear generator output (such as when the motor vehicle is paused in traffic) is also fed into the rectifier 35 and transferred back into the power supply 36.

The propulsion system as discussed above incorporates auxiliary power supply 36 which also is capable of supplying acceleration and high-load demands of the traction motor (e.g., in a motor vehicle, acceleration and hill climbing demands). The power supply generates a linear output which is pulse width modulated by a pulse width power switch circuit 33 which controlled by pulse width modulator circuit 133 and is phase-synchronized by trigger circuit 233 to the frequency and phase of the linear generator pulse frequency modulator 32, and also responds to the accelerator position sensor 31. The power integrator processor 39 analyzes the torque needs of the motor by calculating the motor slip angle (rotor position compared with field rotation), accelerator position, and motor speed. The DC pulse modulator thereby feeds appropriate width auxiliary pulsed power to the stator field at the frequency determined by the pulse frequency modulator.

FIG. 9 shows the electric wave forms in various stages of modification by the control circuits, the pulse frequency modulator 32, the pulse width modulator 33, and the power integrator processor 39. FIG. 9a shows a sine wave output from one coil 54 in one cylinder 66. FIG. 9b shows three phase sine wave output from three cylinders. FIG. 9c shows three-phase inverted (DC) current, inverted by the power switching frequency circuit 32 required by some DC motors. FIG. 9d shows the frequency modulation by the frequency modulation circuit 132 at slow vehicle speed, wherein the frequency modulator is "chopping" out waves from each of the three phases as shown in FIG. 9c. FIG. 9e shows constant linear DC current to be placed in or taken from the power supply 36. FIG. 9f shows a square wave (for purposes of illustration—the pulse shape may be trapezoidal or saw tooth depending on motor characteristics and circuit design) pulse generated from the power supply current through the pulse width power switching circuit 33. FIG. 9g shows three-phase square-wave pulses generated from the power supply through the pulse width power switching circuit 33 and synchronized with the pulses from the frequency modulation circuit 132 illustrated in FIG. 9d. The square wave could be sine waves as shown in FIG. 9h. FIG. 9h shows a combination sine wave pulse from the power frequency switching circuit 32 and square wave pulse from the pulse width power switch circuit 33 integrated into the pulse signal received by the motor. These pulses are combined in series or in parallel depending upon the torque needs of the motor (i.e., current integration or voltage integration). FIG. 9h shows this integration under conditions of increasing load and increasing accelerator position—the frequency of the sine wave is increasing, and the width of the square wave is increasing.

Referring now to FIG. 10, the linear generator 154 generates a sine wave or pulsed output as shown in FIG. 9a. Each phase (3 phases are shown in the embodiment of FIG. 10) of the linear generator 154 is connected to trigger circuit 233 and power switching circuit 32. The frequency modulation circuit 132 is connected to power frequency switching circuit 32, and the output of power frequency switching circuit 32 is connected to power switching merge circuit 140. The output of the pulse width switching circuit 33 is connected to power switching merge circuit 140. Each phase of power switching merge circuit 140 is connected to the appropriate phase winding of the motor 270. Trigger circuit 233 is connected to pulse width modulator circuit 133 for each phase of the pulsed auxiliary output. The output of pulse width modulator circuit 133 is connected to pulse width power switching circuit 33 for each phase of the pulsed output.

Left rotor sensor 43 measures the speed and position of the left rotor and right rotor sensor 42 measures the speed and position of the right rotor. The output of the left rotor sensor 43 and the right rotor 42 is connected to comparator 243 to produce a comparator difference signal and a comparator average signal. The average output of comparator 243 is connected to splitter circuit 144. The output of splitter 144 is connected to a rpm counter signal generator 145. The output of the rpm counter signal generator 145 is connected to power integration processor 39. The output of splitter circuit 144 additionally is connected to difference circuit 146. Difference circuit 146 is connected to power integration processor 39. The output of load sensor 153 is connected to power integration processor 39. These sensors provide input (motor speed, motor slip angle, motor current load, speed differential between the rotors) for the power integration processor. Accelerator position sensor 31 is connected to power integration processor 39. Temperature sensor 160, the difference output of comparator 143 and the output of load sensor 153 is connected to overload processor 151. Reverse switch 37 is connected to frequency modulation circuit 132.

An output of an additional phase of the linear generator (the forth phase from the forth cylinder) is connected to rectifier regenerator circuit 35. The output of rectifier regenerator 35 is connected to auxiliary power supply 36. The output of auxiliary power supply 36 is connected to pulse width power switching circuit 33.

The linear generator 154 generates a pulsed output which could alternately be formed into a pulse signal square wave or pulsed signal sine wave. The number of coils may be varied. The phase relationship may be varied at the time of construction and is dependent on the position of the coils within the cylinder.

The linear generator generates a three phase pulsed output as shown in FIG. 9a. Pulsed output initiates a trigger signal from trigger circuit 233. Accelerator position sensor 31 generates an accelerator signal to provide input to the power integration processor to increase or decrease the speed of the vehicle. Comparator 243 generates signals of the average and difference of the speed and position of the left and right rotor. The average signal is converted to an rpm signal by rpm counter signal generator 145. The rpm signal is to indicate the speed of the vehicle. The field sensor 44 generates a field signal which indicates the position of the field The difference between the average rotor position- signal and the field speed and position signal corresponds to the slip angle signal, and the slip angle signal is generated by difference circuit 146. An increase in the slip angle indicates to power integration processor 39 that additional torque is required by the motor 270. Additional speed required is indicated in an increase in the acceleration position signal. Power integration processor 39 controls the frequency modulation circuit 132 to increase or decrease the number of pulse waves chopped from the converter output Frequency modulator circuit 132 controls power frequency circuit 32, in turn, to increase or decrease the number of pulses which are supplied to the motor. The motor is slowed by the reverse sequence.

As the speed of the rotor slows relative to the speed of the stator field the slip angle increases. Power integration processor 39 detects the increase in slip angle and controls the pulse width modulation circuit to increase the width of the pulse signal from the pulse generator 135. Pulse width modulator circuit 133 controls pulse width power switching circuit 33 which increases the width of a power pulse signal which is generated from auxiliary power supply 36. The power pulse signals are combined with the pulsed signals from the power frequency switching circuit 32 by the power wave merge circuit 140. The torque of the motor is increased. Torque is decreased by decreasing the width of the power pulses.

Load sensor 153 is connected to power integration processor 39. The load sensor detects the magnitude of the motor current load and the instantaneous change in current load of the motor.

Overload processor 151 is connected to comparator 243 temperature sensor 160 and load sensor 153. Overload processor 151 detects the load sensor signal, the difference signal and a temperature signal. The output of the overload processor is connected to the power integration processor 39. When load sensor, slip angle, rotor speed difference, or the temperature signals reach a predetermined value the overload processor generates an overload signal to limit the power integrator processor 39, which in turn limits motor 270 overload. Auxiliary power supply 36 stores energy to supply pulse width power switching circuit 33 with energy when there has been insufficient energy such as when climbing steep hills, etc. A fourth coil of the linear generator 154 is connected to a rectifier regenerator 35. Motor 270 is connected to the rectifier generator 35. A pulsed power is generated by a fourth coil 54 and supplied to rectifier regenerator 35. This pulsed power is rectified and supplied to auxiliary power supply 36 to recharge the power supply. Motor 270 generates energy when braking or descending a steep hill. This power is supplied to rectifier regenerator circuit 35 to be rectified and resupplied to auxiliary power supply 36.

Figure 7:
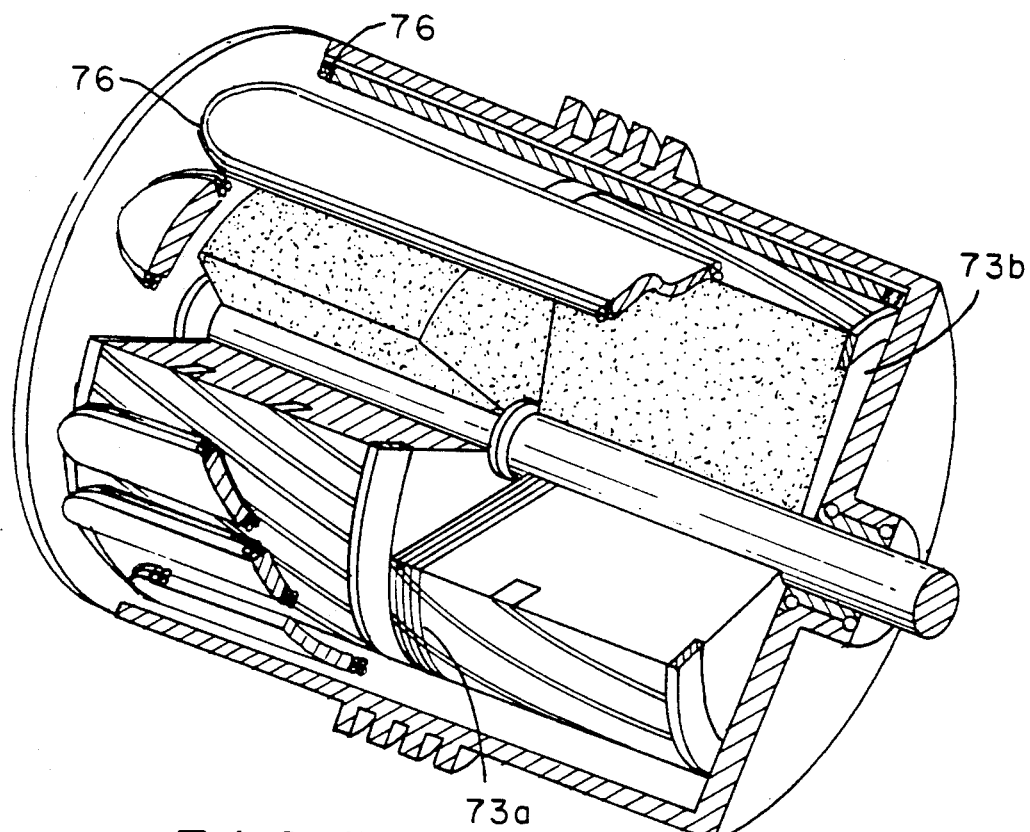
FIG. 7 is a perspective view, partly cut away and sectioned view of the electric drive motor.
Figure 7A:
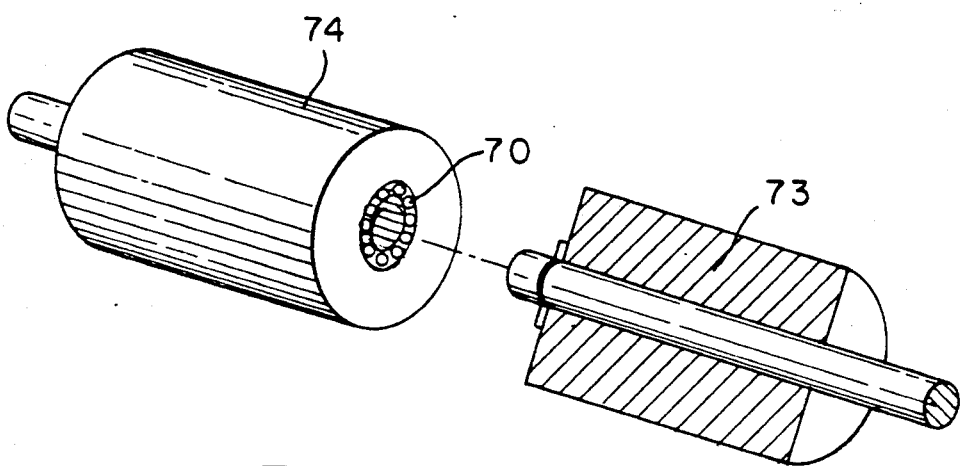
FIG. 7a is an exploded perspective view partially in section of the rotors of the motor of FIG. 7.

Details of the motor 270 are shown in FIG. 7; a rotor pilot bearing and thrust bearing is positioned between the right rotor 73 and the left rotor 74 to allow right rotor 73 to rotate relative to left rotor 74.

Figure 8:
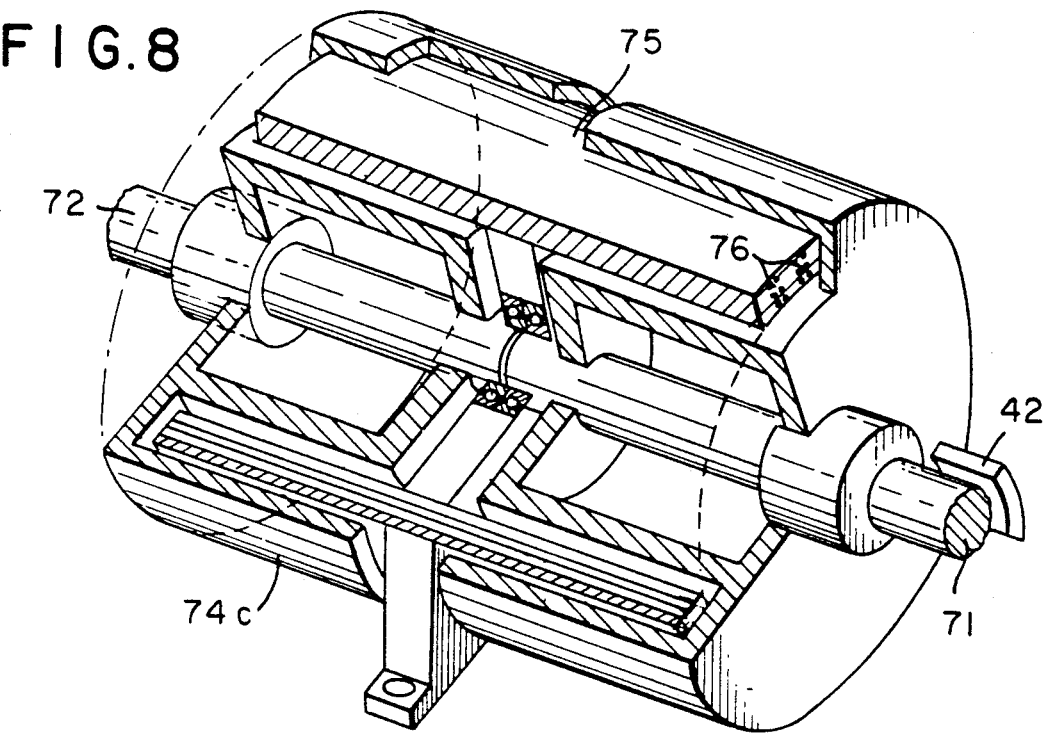
FIG. 8 is a perspective view, partly cut away and sectioned of the electric drive motor of the preferred embodiment with shell-type permanent magnet rotors.
Figure 8A:
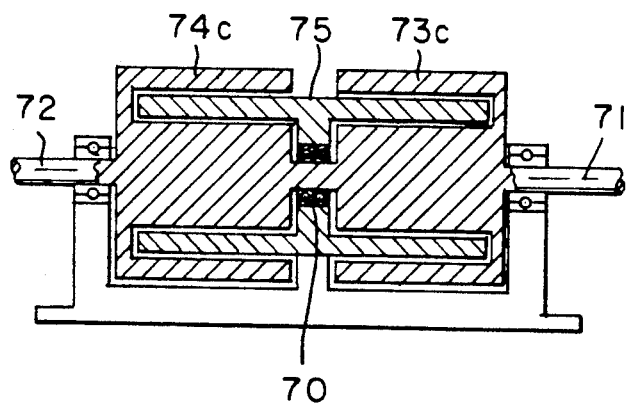
FIG. 8a is an elevational view in cross section of the shell-type electric motor of FIG. 8.
Figure 8B:
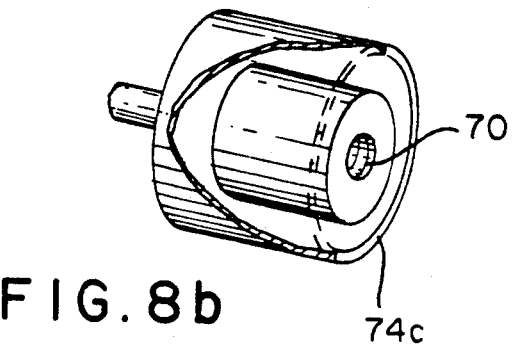
FIG. 8b is a perspective and partially cut away view of the rotor of FIG. 8.

FIGS. 8 and 8b show the preferred embodiment shell type rotor. Left rotor 374 and right rotor 373 each is substantially a cylinder. Each rotor contains two circumferential apertures which are adapted to receive stator 75. Stator 75 is shaped as a hollow cylinder. Stator 75 is mounted on mounting brackets 170. Mounting brackets 170 is mounted approximately in the center of stator 75. Right drive shaft 71 and left drive shaft 72 are each journaled in mount 172 which is mounted in the on rotor 373 and 374 respectfully. Rotor 373 and 372 both and mounted on rotor pilot bearing and thrust bearing 70. FIG. 8b shows the rotor pilot bearing and thrust bearing 70 and the left rotor 374. Bearing 70 is mounted between right rotor 373 and left rotor 374 to allow right rotor 373 to turn relative to left rotor 374.

What is claimed is:

1. An electro-mechanical propulsion system for a vehicle comprising:

an external combustion, free piston multiple-cylinder engine;

linear electric generator means for generating electric power from said engine including linear element generator means integrally mounted in said engine for converting mechanized to electrical power;

means for adjusting a mechanical and electrical phase relationship between said engine and said generator means;

a manual accelerator and an electric traction motor;

means for controlling the electric output of the linear generator means corresponding to an accelerator position, and motor speed;

an auxiliary power source comprising means for controlling output of said auxiliary power source corresponding to the load on said motor, said auxiliary power source being synchronized with the said means for controlling output of said linear generator means;

said electric traction motor being connected as the prime mover means for propelling said vehicle, said motor being connected to be actuated by said linear generator and said auxiliary power supply, said electric motor including two independent and synchronized rotors, each of said rotors including an output shaft for connection to the vehicle propulsion means.

2. The propulsion system of claim 1, wherein there are at least two linear electric generator means, one of which is connected to said auxiliary power source and the remaining linear electric generating means are connected to said controlling means.

3. The electro-mechanical propulsion system as in claim 1, wherein said armature coils are configured to produce single phase alternating current.

4. The propulsion system of claim 1, wherein there are four electric generating means, and wherein three of said four linear electric generating means are connected to said controlling means and the fourth linear electric generating means is connected to said auxiliary electric power supply.

5. The propulsion system as in claim 1, wherein said linear electric generating means are configured so as to produce single phase, phase-synchronized electric current.

6. The propulsion system as in claim 1, wherein said linear electric generating means are configured so as to produce multi-phase, phase-synchronized electric current.

7. The propulsion system as in claim 1, wherein the external combustion free piston engine is a single-acting, four cylinder diametrically-opposed Stirling-type engine.

8. The system as in claim 1, wherein the external combustion free piston engine is a diametrically-opposed, four cylinder Siemens/Rinia-type engine.

9. The electric traction motor as in claim 1, wherein each of said rotors are permanent magnet pancake-type rotors.

10. The electric traction motor as specified in claim 1, wherein each of said rotors is a permanent magnet disc rotor.

11. The electric traction motor as specified in claim 1, wherein each of said rotors is a double shell-type permanent magnet rotor.

12. The electric traction motor as specified in claim 1, wherein each of said rotors are induction rotors.

13. The motor as specified in claim 1, wherein each rotor includes a drive shaft comprising means for sensing rotor speed and position of said first and said second rotors and means for sensing the rotational speed and position of the motor magnetic field;

processor means for comparing a difference between said rotor speeds and switching means for controlling said motor speed.

14. An electro-mechanical propulsion system for vehicles comprising:

an electro-mechanical converter means including an external combustion, free piston four-cylinder engine; said engine comprising a plurality of cylinders and pistons connected by a plurality of shafts, said plurality of shafts being connected to said pistons; and an integral linear electric generator means for converting power from said engine, one such means associated with each of said four cylinders;

each of said four linear generator means comprising a plurality of permanent magnetic elements, at least one of said permanent magnet element fixed to at least one said plurality of pistons and piston shafts and a plurality of cylindrical armature coils at least one of which is fixed to each of said plurality of cylinders located in said engine, said linear generator means generating a linear generator electric signal frequency;

a manual accelerator and an electric traction motor;

means for controlling the linear generator electric signal of the linear generator means, the output of said controlling means corresponding to an accelerator position, motor speed, and motor load;

an auxiliary electric power supply to supply auxiliary electric power comprising means for modulating said electric power into a pulsed signal, a width of said pulsed signal corresponding to the load on said motor, and means for synchronizing said pulsed signal with said linear generating signal;

said electric traction motor being connected as the prime mover means for propelling said vehicle, said electric motor operating on current correlated to the frequency of said linear generator, said electric motor being connected to the auxiliary electric power supply and linear generator means through said controlling means;

said electric motor including one common wound stator generating a rotating magnetic field, and two opposing rotor elements, each including a first end and a second end, said first end of said opposing rotor elements being connected to a pilot bearing, said second end being connected to a propulsion shaft;

said two opposing rotors including a first rotor and a second rotor, said first and said second rotor rotating in the same magnetic field;

transducer means for sensing said field speed and the rotational speed of said first rotor and said second rotor, said transducer means being connected to said controller means;

means for synchronizing the speed of said first rotor and said second rotor.

15. The propulsion system of claim 14, wherein there are at least two linear electric generator means, one of which is connected to said auxiliary power source and the remaining linear electric generating means are connected to said controlling means.

16. The electro-mechanical propulsion system as in claim 14, wherein said armature coils are configured to produce single phase alternating current.

17. The propulsion system of claim 14, wherein three of said four linear electric generating means are connected to said controlling means and the fourth linear electric generating means is connected to said auxiliary electric power supply.

18. The propulsion system as in claim 14, wherein the armature coils are configured so as to produce single-phase, phasesynchronized electric current.

19. The propulsion system as in claim 14, wherein the coils are configured so as to produce multi-phase, phase-synchronized electric current.

20. The propulsion system as in claim 14, wherein the external combustion free piston engine is a single-acting, four cylinder diametrically-opposed Stirling-type engine.

21. The system as in claim 14, wherein the external combustion free piston engine is a diametrically-opposed, four cylinder Siemens/Rinia-type engine.

22. The system as in claim 14, wherein said plurality of shafts comprising a piston rod for each piston, each said rod having its proximal end secured to its respective piston and its distal end adjustably secured to he distal end of the piston rod opposed thereto;

23. The electric traction motor as specified in claim 14, wherein each of said rotors are permanent magnet pancake-type rotors.

24. The electric traction motor as specified in claim 14, wherein each of said rotors is a permanent magnetic disc rotor.

25. The electric traction motor as specified in claim 14, wherein each of said rotors is a double shell-type permanent magnet rotor.

26. The electric traction motor as specified in claim 14, wherein each of said rotors are induction rotors.

27. The motor as specified in claim 14, wherein each rotor includes a drive shaft comprising means for sensing rotor speed and position of aid first and second rotors and means for sensing the rotational speed and position of the motor magnetic field, processor means for comparing a difference between said rotor speed and switching means for controlling said motor speed.

* * * * *